(12) United States Patent
Caudevilla Laliena et al.

(10) Patent No.: US 8,229,358 B2
(45) Date of Patent: Jul. 24, 2012

(54) IDENTIFICATION, AUTHENTICATION AND COVERAGE CONTROL METHOD

(75) Inventors: Guillermo Caudevilla Laliena, Huesca (ES); Guillermo Cajigas Bringas, Madrid (ES); Hector Berna Fornies, Zaragoza (ES)

(73) Assignees: Vodafone Group PLC, Newbury, Berkshire (GB); Vodafone Espana, S.A., Alcobendas, Madrid (ES)

( * ) Notice: Subject to any disclaimer, the term of this patent is extended or adjusted under 35 U.S.C. 154(b) by 1 day.

(21) Appl. No.: 12/523,721

(22) PCT Filed: Jan. 18, 2008

(86) PCT No.: PCT/ES2008/000027
§ 371 (c)(1),
(2), (4) Date: May 3, 2010

(87) PCT Pub. No.: WO2008/087241
PCT Pub. Date: Jul. 24, 2008

(65) Prior Publication Data
US 2010/0210242 A1    Aug. 19, 2010

(30) Foreign Application Priority Data
Jan. 19, 2007 (ES) .................................. 200700160

(51) Int. Cl.
*H04B 7/00* (2006.01)
*H04M 1/66* (2006.01)
*H04M 1/68* (2006.01)
*H04M 3/16* (2006.01)
(52) U.S. Cl. ...................................... 455/41.2; 455/411
(58) Field of Classification Search .................. 455/411, 455/41.2
See application file for complete search history.

(56) References Cited

U.S. PATENT DOCUMENTS

| | | | |
|---|---|---|---|
| 6,782,253 B1 * | 8/2004 | Shteyn et al. | 455/414.1 |
| 2002/0137462 A1 * | 9/2002 | Rankin | 455/41 |
| 2002/0194500 A1 | 12/2002 | Bajikar et al. | |
| 2003/0197488 A1 | 10/2003 | Hulvey et al. | |
| 2004/0139217 A1 * | 7/2004 | Kidney et al. | 709/232 |
| 2004/0266347 A1 * | 12/2004 | Palin et al. | 455/41.1 |
| 2004/0266439 A1 * | 12/2004 | Lynch et al. | 455/444 |
| 2005/0015604 A1 * | 1/2005 | Sundararajan et al. | 713/184 |
| 2005/0180425 A1 | 8/2005 | Ruuska et al. | |
| 2006/0029015 A1 | 2/2006 | Hinsey et al. | |
| 2007/0254657 A1 * | 11/2007 | Satoh et al. | 455/435.2 |
| 2008/0002758 A1 * | 1/2008 | Schmidt et al. | 375/130 |
| 2008/0070504 A1 * | 3/2008 | Benkert et al. | 455/41.2 |
| 2008/0189793 A1 * | 8/2008 | Kirkup et al. | 726/27 |

FOREIGN PATENT DOCUMENTS
EP    1370050    12/2003
WO    02/01804    1/2002

* cited by examiner

*Primary Examiner* — Nathan Mitchell
(74) *Attorney, Agent, or Firm* — Workman Nydegger

(57) ABSTRACT

Identification, authentication, and coverage control method implemented in a system including a central entity, a network of beacons, and a set of terminals, where each terminal is a device adhered to a beacon. The method includes defining a profile for each terminal, the profile including a coverage control service and a service connection authentication service, each service having an exclusive identifier. The coverage control service is connected when a beacon detects a device and the device is indentified as a terminal of the system. A service connection of the device is authenticated based on messages exchanged between the device and the beacon. If the authentication is positive, the device is allowed to adhere to the beacon and if the authentication is negative, the device is indentified as belonging to the system by not adhered to the beacon.

4 Claims, 1 Drawing Sheet

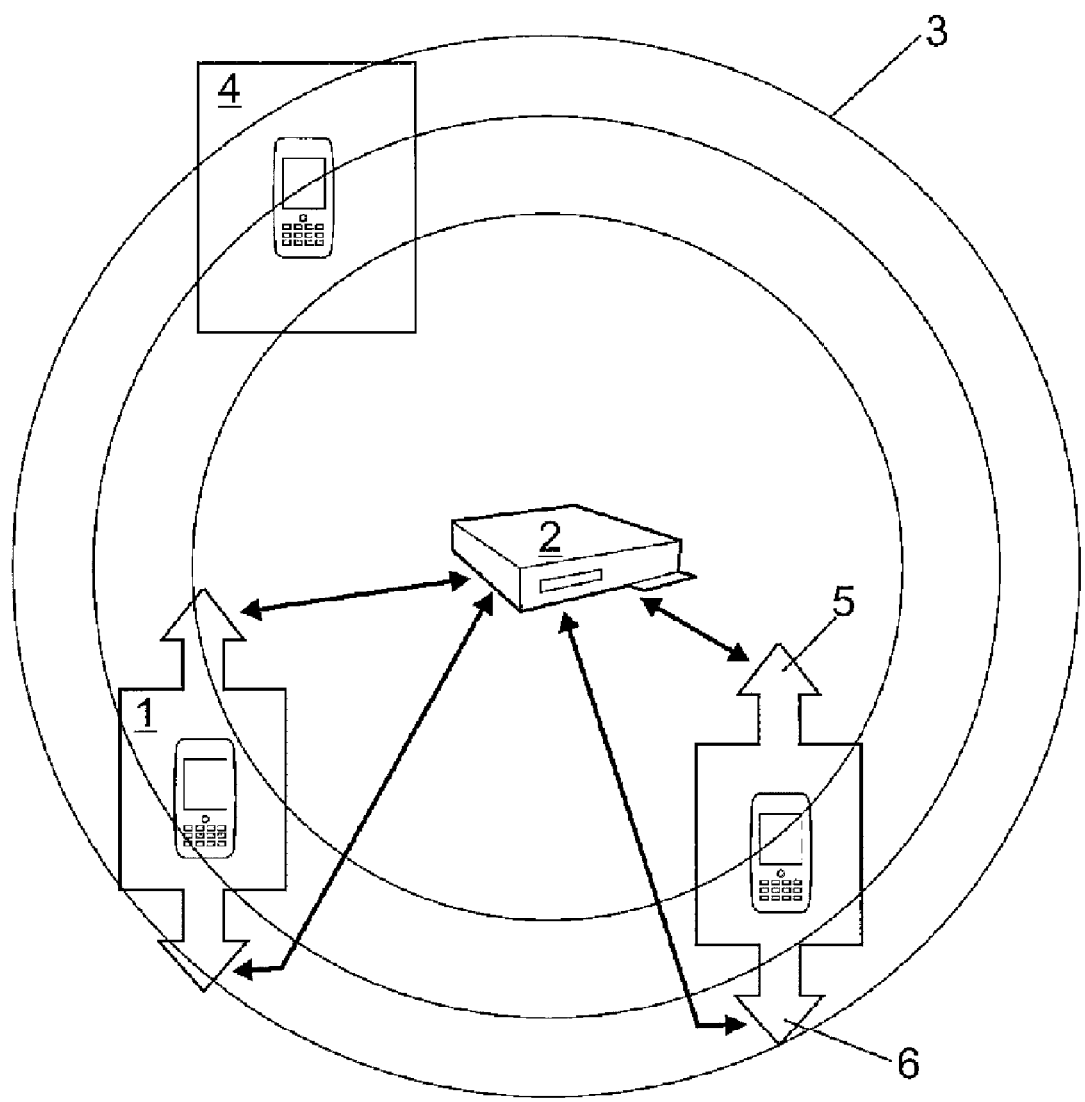

IDENTIFICATION, AUTHENTICATION AND COVERAGE CONTROL METHOD

OBJECT OF THE INVENTION

The object of the present invention is to define the way in which, in a beacon system providing Bluetooth® coverage, when they enter the coverage area, the different terminals are identified, authenticated and provided with services, as well as defining how they perform the control of their coverage status.

The present invention refers to the field of telecommunications networks. More specifically, it refers to the identification and authentication of mobile telephony users within a beacon system that provide coverage based on the Bluetooth® standard.

BACKGROUND OF THE INVENTION

It is known in the field of mobile telephony that abbreviations and acronyms are frequently used. The following is a glossary of abbreviations/acronyms and a series of terms, used in the present descriptive memory, which are defined below:

RF: radio frequency

Bluetooth®: specification that defines a global wireless communication standard, enabling the transmission of voice and data between different equipment by a RF link.

Beacon: device providing Bluetooth® coverage to an area and that manages the credential control of the different users (see Authentication below).

Bluetooth® device: mobile device compatible with Bluetooth® use.

Terminal: mobile device with Bluetooth® capabilities that interacts with the beacon.

User: person who uses the terminal.

Authentication: process to determine if a user is authorized to perform a given action. Some authentication systems include both the identification and the authorization, while others only include one or the other. In this case, since the objective of the system is simply to identify the user and inform them of their coverage status, only the identification will be required.

Coverage: range of action in which the beacon is visible to a terminal.

Bluetooth® profile: services offered by a Bluetooth® device.

User credential: data that identify a terminal and that enable to successfully authenticate itself against a specific beacon.

Bluetooth® is the specification that defines a global wireless communication standard, which enables to transmit voice and data between different equipments through a RF link. This voice and data exchange is carried out through the execution of the different services the devices have.

Bluetooth® defines a procedure of recognition of Bluetooth® devices. In this way, a Bluetooth® device can "see" what other Bluetooth® devices are within its range. This recognition is not automatic in mobile devices or computers, instead it is the user who needs to manually (or the application) update the list launching the procedure that the Bluetooth® standard provides thereto. The list includes the name the user has given to his/her device, and which can be any network since in a mobile phone the user can change the Bluetooth® name of his/her device, as well as the MAC Bluetooth® address, a unique identifier of the device provided by the manufacturer and which cannot be changed.

Once a Bluetooth® device has obtained a list of neighboring devices, that is to say, those which are inside its range, it also has the possibility of recognizing which services displays each one of the neighbors or trying to directly connect to a service by means of the service identifier. Again it is the user, or an application, that launches the request. To perform this task, both devices (both the one performing the request and the one receiving it) have to implement the Service Discovery Application (SDAP) profile, which will provide a service recognition service, forgive the repetition, that both devices will know how to use.

The Bluetooth® profiles define the services that a Bluetooth® device has and how they should be used. This definition ensures that the devices that implement the same profile can communicate without interoperability problems. The following are examples of profiles:

Generic access (GAP)
Service Discovery Application (SDAP)
Serial Port (SPP)
Dial-up networking (DUN)
. . .

Bluetooth®, in turn, defines a procedure to recognize Bluetooth® devices. In this way a Bluetooth® device can probe the Bluetooth® devices within its range.

The Bluetooth® standard defines an authentication procedure based on the matching of devices. Said matching is produced only the first time the devices try to connect, and serves for the users to allow the connection between their Bluetooth® devices inserting a common code (PIN). In mobile telephony, it is the user who decides if his/her device requires this authentication to accept connection requests from other Bluetooth® devices. If the matching is not required, then any other Bluetooth® device can be connected to the user's mobile phone. However, it is quite a limited procedure since it does not allow the exchange of additional data (it is neither flexible nor polyvalent), the codes exchanged do not provide a high level of security and, most importantly, it authenticates at device level, not at service level, so that once the devices are matched any of its services can exchange data.

After the matching, both Bluetooth® devices can start exchanging data using one of the services they have. Bluetooth® uses a Frequency Hopping system, that is to say, every certain amount of time it changes the frequency at which it transmits, so as to minimize interferences from other systems transmitting in close bands. Obviously, certain synchronization is necessary between the two devices connected to always use the same frequency at a given time. To that end, Bluetooth® has a service channel called synchronism. Without this channel communication cannot take place, the loss of the synchronism channel causes the loss of connection to a service.

The invention described in the present invention patent is framed within a Bluetooth® beacon system. Said beacons are connected to a central entity which provides them the credentials of its associated users. Thus, we have a system with the following members:

A central entity sending the user's credentials to the terminals and to the beacons which constitute the system.

A network of beacons, each one of them granting coverage to a specific area and saving the credentials of all the terminals associated to said beacon.

A set of terminals (Bluetooth® devices) adhered to the system, each one of them with a credential for each beacon in which it is authorized.

The beacons are continuously looking for Bluetooth® terminals adhered to the system, that is to say, system users. Therefore, the beacons have to discriminate the terminals adhered to the system from the rest of Bluetooth® devices. However, the data provided by Bluetooth® after device recognition do not enable us to discriminate:

a) The Bluetooth® identifier of the device is defined by the user, so it is not unique, and it can be changed by him/her at any time. Furthermore, it does not add any information besides the user name recognizable by the owner.

b) The MAC Bluetooth® address is unique, provided by the manufacturer, but it does not contain information that enables us to identify if the device is a terminal of the system or not. For it to be useful, the system should keep and correctly update a data base with the MAC Bluetooth® addresses of the terminals, which excessively complicates the users' provision.

A terminal detected by a beacon, that is to say, which has passed the filter and is recognized as part of the system, must immediately know its new coverage status; the beacon, in turn, must control which terminals are within its coverage. Both entities, beacon and terminal, need to have strict control of the coverage (that is to say, they have to instantly know when a terminal enters or leaves coverage area. This same method in the terminal is unviable due to the excessive battery consumption it entails.

Once the beacon has detected which are the real system users, the beacon and terminals have to be able to launch the authentication procedure in a way clear to the user. This will enable both entities, upon completion, to know if the terminal is in the area defined by a beacon to which it is associated or not. At this point, the MAC Bluetooth® standard matching procedure is a necessary step previous to the credential exchange, but it cannot be substituted for the following reasons:

a) It cannot be performed in a way clear to the user. The user has to insert his/her PIN on the phone.

b) It is not possible to add encoding besides the one provided by Bluetooth® in the transportation layer.

c) It is not extensible; we cannot make it send new parameters or data which may be necessary in future versions of the system.

As an example, we can mention the American patent application US 2002/141586 which describes a device and method that can communicate with other networks using Bluetooth®, including at least authentication functionality.

The Japanese patent application JP-2003-333052 describes a way to provide mobile terminals with services that depend on the localization, using a short-range technology like Bluetooth®. However, no mobile terminal identification or special authentication method is mentioned to receive these position-dependent services.

Nevertheless, none of this prior art solves the aforementioned problems relating to:

Identification: The beacons have to be able to discriminate the terminals of one's device from the rest of the Bluetooth® devices.

Coverage control: Between the beacon and the terminal it is necessary to instantly know when the terminal enters or leaves the coverage area.

Authentication: The beacon and the terminals have to be able to launch the authentication procedure (in a way clear to the user) which will enable, upon completion, both entities to know if the terminal is within the area defined by a beacon to which it is associated or not.

DESCRIPTION OF THE INVENTION

The present invention refers to an identification, authentication and coverage control method according to claim 1. Preferred embodiments of this method are defined in the dependent claims.

The present invention refers to the method used to identify, authenticate and control the coverage of Bluetooth® devices adhered to a system consisting of different beacons connected to a central entity which provides them with credentials of its associated users. Therefore, it is a system comprising:

A central entity which sends out the user's credentials both to the terminals and to the beacons which constitute the system.

A network of beacons, each one of them granting coverage to a specific area and saving the credentials of all the terminals associated to that beacon.

A group of terminals (Bluetooth® devices adhered to the system), each of them having a credential per each beacon in which it is authorized.

A Bluetooth® profile is defined for terminal identification, and it must be used by all the terminals. Such profile provides two services: an authentication service which shall be used as a way to exchange the user's credentials; and a coverage control service which shall be used to immediately monitor coverage loss. Both of these services have a service identifier which shall be exclusive and the same in all the devices.

Once the Bluetooth® device has been detected by the beacon, said beacon attempts to connect to the device coverage service using the exclusive service identifier defined for that service. If the connection request fails, then the Bluetooth® device is not a terminal of the system. If, on the contrary, the beacon connects to the service identified by said service identifier, the next step is to verify that the service is the coverage control service and not another service with the same service identifier; to that end, two messages are exchanged, one confirming there is available service from the beacon to the terminal, and another which is the reply message from the terminal to the beacon. Upon completion of this process, we shall know whether the Bluetooth® device is a terminal or not. In case it is, we are connected to its coverage control service.

The advantages offered by this system are, on the one hand, the possibility to discriminate the terminals from the rest of the Bluetooth® devices, since the terminals will feature (from the factory) specific Bluetooth® services with exclusive service identifiers, where said identifiers can only be changed after reconfiguration of the terminal internal software, which is not accessible to the user. Therefore, a user cannot keep the terminal undetectable to a beacon.

Another advantage offered by this system is that the beacon allows the discrimination of the terminals from the rest of the Bluetooth® devices with hardly any collaboration from them. This allows energy savings for the device battery, which, in this technical field, is a critical development parameter.

A third advantage is that the beacon shall never try to match a Bluetooth® device alien to the system since it must have previously identified the terminal as such. The procedure is the following:

If connection to the coverage control service of the Bluetooth® device fails, the device does not register it and the beacon verifies it was not a terminal.

If the connection succeeds, and only if it is the first time both entities connect, Bluetooth® shall start the standard matching procedure. The user shall insert the predefined PIN and the process shall follow its regular path until connection is complete.

The coverage control service is a message service. After the terminal identification, no further data are exchanged in this service. However, both beacon and terminal must thoroughly monitor the status of said channel because the moment the terminal is out of coverage, the Bluetooth® synchronism channel shall stop working and at the same time the coverage control service shall also stop working, producing an event both devices will be able to detect (connection failure), the coverage loss being immediately detected.

The advantages offered by the coverage control service are, on the one hand, the simplification of such control since the monitoring of the coverage service eliminates the use of a ping-based system or in consecutive execution of the device-recognition service, which are more difficult to keep and implement.

On the other hand, the system enables the beacon and the terminal to immediately detect coverage loss as "connection failure" instead of consecutively executing the device recognition service or using the ping-based system which brings about delay inconveniences and great energy consumption by the battery.

Finally, as there is no data exchange, the system enlarges the beacon coverage area; consequently, the disconnection of the coverage service only depends on the availability of the synchronism channel of the system itself, improved according to the Bluetooth® standard and more stable than a connection with data which has to be processed and interpreted, such as pings.

Authentication takes place after confirming that the Bluetooth® device is a terminal and securing its coverage control. The next step is to verify if the terminal is connected to this beacon or not. To that end, the beacon launches the authentication process. That is to say, the beacon connects to the authentication service which the terminal must have since it is a device associated to the system. During the authentication process, four messages are exchanged:

Message 1: The beacon sends the terminal its beacon identifier and requests it to send the user's credentials.

Message 2: The terminal receives the beacon identifier and searches for the credential associated to that identifier. Once the credential has been located, the terminal sends it back to the beacon for its verification.

Message 3: The beacon verifies the credential against its user data base and sends a message to the terminal informing of the result of the verification (OK or KO).

Message 4: The terminal is able, at last, to identify whether it is within its beacon or not, and sends the beacon an ACK (acknowledgement).

The advantages of the authentication are, first of all, that it defines an exclusive way of exchanging data with the beacon so that only the terminals can do so in a way that is completely clear to the user.

Another advantage is that it can be expanded, that is, new parameters can be added for the exchange, or for security if necessary.

At the same time, this system allows the additional authentication to the Bluetooth® matching defined by the standard. That is, it allows the authentication on the application level, regardless of which application it serves with this method. Therefore, the use of this application is more flexible, and periodic or random authentications triggered by the beacon can be carried out after a certain period of time.

BRIEF DESCRIPTION OF THE DRAWINGS

The following is a brief description of a series of drawings which will help understand the invention better relating to an embodiment of said invention which is presented as a non-limiting example thereof.

FIG. 1 shows a scheme of the system where the method object of the present invention has been implemented.

PREFERRED EMBODIMENT OF THE INVENTION

As it can be easily observed in the attached drawings, the system on which the identification, authentication and coverage control method is implemented comprises:

A central entity: it sends the user's credentials both to the terminals [1] and to the beacons [2].

A network of beacons [2]: each one of them grants coverage [3] to a specific area and saves the credentials of all the terminals [1] associated to that beacon [2].

A set of terminals [1]: the terminals [1] are Bluetooth® devices [4] adhered to the system, each of them having one credential per beacon [2] in which it is authorized.

A profile is defined for the terminals [1] including two services, with a service identifier which is exclusive and the same for all the devices [4]. These services are:

Authentication service [5]: it is used to exchange user's credentials.

Coverage control service [6]: it is used to immediately monitor coverage loss.

When the Bluetooth® device [4] is detected by the beacon [2], it tries to connect to the coverage service of the device [4] using the service identifier of the exclusive service defined by this service. Two events may take place:

Connection: In this case it will be confirmed that the coverage control service is being used and not another service with the same identifier. Two messages are exchanged, one to inform the terminal [1] of the availability of the beacon [2] and one which is a reply from the terminal [1] to the beacon [2]. In this way we shall know whether the Bluetooth® [4] device is a terminal [1] of the system or not. In case it is, we are connected to its coverage control service [6].

Connection failure: The Bluetooth® device [4] is not a terminal [1] of the system.

The coverage control service [6] is a message service. After the terminal [1] identification, no further data are exchanged in this service [6]; however, both beacon [2] and terminal [1] must monitor the status of the Bluetooth® synchronism channel, because the moment the terminal [1] is out of coverage [3], this channel shall stop working and at the same time the service shall also stop working, which shall cause a "connection failure" that both devices [1] and [2] will detect; thus, coverage loss [3] will be immediately detected.

After we have confirmed that the Bluetooth® device [4] is a terminal [1] and its coverage control has been ensured, the method object of the present invention describes the following stage, which is the verification process of the terminal [1] link to the beacon [2]. To that end, first of all, the beacon [2] launches the authentication process, that is, it connects to the terminal [1] authentication service [5]. During this process, four messages are exchanged:

Message 1: The beacon [2] sends the terminal [1] its beacon identifier [2], and requests the user's credentials.

Message 2: The terminal [1] receives the beacon [2] identifier and searches for the credential associated to that identifier. Once the credential has been located, the terminal sends it back to the beacon [2] for its verification.

Message 3: The beacon [2] verifies the credential against its user data base and sends a message to the terminal [1], informing of the result of said verification (OK or KO).

Message 4: The terminal [1] finally identifies whether it is in its beacon [2] or not, and sends the beacon [2] an ACK (acknowledgement).

The invention claimed is:

1. An identification, authentication and coverage control method, implemented on a system having a central entity, a network of beacons and a set of terminals, in which each terminal is a device that is adhered to at least one beacon, the method comprising:
    defining a profile for each terminal, the profile including a service connection authentication service and a coverage control service, each service having a service identifier which is exclusive to the service and the same for all devices;
    connecting to the coverage control service of a device when the device is detected by a given beacon of the network;
    identifying the device as a terminal of the system when a connection between the device and the beacon is confirmed;
    authenticating a service connection by the device to the beacon by exchanging at least four messages via the connection between the beacon and the service connection authentication service of the device;
    wherein if the service connection authentication process is positive, allowing the device to adhere to the beacon; and
    wherein if the service connection authentication process is negative, identifying that the device belongs to the system but is not adhered to the beacon.

2. The identification, authentication and coverage control method according to claim 1, wherein to connect to the coverage control service of the device, two messages are exchanged between the device and the beacon, a first message confirming there is available service from the beacon to the device, and a second message which is the reply message from the device to the beacon.

3. The identification, authentication and coverage control method according to claim 1, wherein the coverage control service comprises monitoring the status of a Bluetooth® synchronism channel.

4. The identification, authentication and coverage control method according to claim 1, wherein the service connection authentication process comprises:
    sending a first message from the beacon to the device, the first message including a beacon identifier and requesting user's credentials from the device;
    receiving at the beacon a second message from the device including the requested user's credentials, the user's credentials being associated with the beacon identifier
    verifying at the beacon the received user's credentials against a user database;
    sending a third message to the device informing of the result of the verification; and
    receiving at the beacon a fourth message including an acknowledgement of the third message.

* * * * *